(12) United States Patent
Mak

(10) Patent No.: US 8,950,196 B2
(45) Date of Patent: Feb. 10, 2015

(54) CONFIGURATIONS AND METHODS FOR WASTE HEAT RECOVERY AND AMBIENT AIR VAPORIZERS IN LNG REGASIFICATION

(75) Inventor: John Mak, Santa Ana, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 449 days.

(21) Appl. No.: 13/003,249

(22) PCT Filed: Jul. 17, 2009

(86) PCT No.: PCT/US2009/050945
§ 371 (c)(1),
(2), (4) Date: Mar. 21, 2011

(87) PCT Pub. No.: WO2010/009371
PCT Pub. Date: Jan. 21, 2010

(65) Prior Publication Data
US 2011/0167824 A1    Jul. 14, 2011

Related U.S. Application Data

(60) Provisional application No. 61/081,636, filed on Jul. 17, 2008.

(51) Int. Cl.
*F17C 9/02* (2006.01)
*F01K 17/02* (2006.01)
(Continued)

(52) U.S. Cl.
CPC ... *F17C 5/06* (2013.01); *F17C 9/02* (2013.01); *F17C 2201/052* (2013.01); *F17C 2201/054* (2013.01); *F17C 2205/0323* (2013.01); *F17C 2221/033* (2013.01); *F17C 2223/0161* (2013.01); *F17C 2223/033* (2013.01); *F17C 2225/0123* (2013.01); *F17C 2225/035* (2013.01); *F17C 2227/0135* (2013.01); *F17C 2227/0311* (2013.01); *F17C 2227/0316* (2013.01); *F17C 2227/0323* (2013.01); *F17C 2227/0327* (2013.01); *F17C 2227/0362* (2013.01); *F17C 2250/0631* (2013.01); *F17C 2250/0636* (2013.01); *F17C 2260/046* (2013.01); *F17C 2260/053* (2013.01); *F17C 2265/05* (2013.01); *F17C 2270/0581* (2013.01)
USPC .......... 62/50.2; 62/79; 60/645; 60/648; 60/655

(58) Field of Classification Search
USPC ................................. 62/50.2, 50.3
See application file for complete search history.

(56) References Cited

U.S. PATENT DOCUMENTS 3,726,085 A * 4/1973 Arenson .............. 60/772
4,036,028 A * 7/1977 Mandrin .............. 62/50.3
(Continued)

FOREIGN PATENT DOCUMENTS

CA         2480627        10/2003
WO    WO 2006019900 A1 *  2/2006
(Continued)

*Primary Examiner* — Thomas Denion
*Assistant Examiner* — Steven D Shipe
(74) *Attorney, Agent, or Firm* — Fish & Tsang, LLP

(57) ABSTRACT

Contemplated power plants and LNG regasification facilities employ a combination of ambient air and non-ambient air as continuous heat sources to regasify LNG and to optimize power production. Most preferably, contemplated plants and methods are operable without the need for supplemental heat sources under varying temperature conditions.

12 Claims, 3 Drawing Sheets

(51) Int. Cl.
*F01K 23/04* (2006.01)
*F17C 5/06* (2006.01)

(56) References Cited

U.S. PATENT DOCUMENTS

| | | | |
|---|---|---|---|
| 5,251,452 A | 10/1993 | Wieder | |
| 5,394,686 A * | 3/1995 | Child et al. | 60/780 |
| 5,457,951 A * | 10/1995 | Johnson et al. | 60/780 |
| 6,374,591 B1 * | 4/2002 | Johnson et al. | 60/783 |
| 7,155,917 B2 | 1/2007 | Baudat | |
| 7,299,619 B2 * | 11/2007 | Briesch et al. | 60/39.5 |
| 7,392,767 B2 | 7/2008 | Franklin et al. | |
| 7,574,856 B2 * | 8/2009 | Mak | 60/39.182 |
| 7,980,081 B2 * | 7/2011 | Mak | 60/779 |
| 8,181,439 B2 * | 5/2012 | Harada | 60/39.182 |
| 8,316,665 B2 * | 11/2012 | Mak | 62/620 |
| 2002/0059792 A1 * | 5/2002 | Oto et al. | 60/39.182 |
| 2005/0223712 A1 * | 10/2005 | Briesch et al. | 60/772 |
| 2006/0156744 A1 | 7/2006 | Cusiter et al. | |
| 2006/0236699 A1 * | 10/2006 | Klochko et al. | 60/671 |
| 2006/0242970 A1 * | 11/2006 | Yang et al. | 62/50.2 |
| 2006/0260330 A1 * | 11/2006 | Rosetta et al. | 62/50.2 |
| 2007/0044485 A1 * | 3/2007 | Mahl | 62/50.2 |
| 2007/0079617 A1 | 4/2007 | Farmer et al. | |
| 2007/0214804 A1 * | 9/2007 | Hannan et al. | 62/50.2 |
| 2007/0214805 A1 | 9/2007 | MacMillan et al. | |
| 2007/0214806 A1 * | 9/2007 | Faka | 62/50.2 |
| 2007/0214807 A1 * | 9/2007 | Faka | 62/50.2 |
| 2008/0047280 A1 | 2/2008 | Dubar | |
| 2008/0190106 A1 * | 8/2008 | Mak | 60/531 |
| 2008/0307789 A1 * | 12/2008 | Mak | 60/651 |
| 2009/0126372 A1 * | 5/2009 | Faka | 62/50.2 |
| 2009/0226308 A1 * | 9/2009 | Vandor | 415/178 |
| 2009/0277189 A1 * | 11/2009 | Eie et al. | 62/50.2 |
| 2009/0282836 A1 * | 11/2009 | Mak | 60/783 |
| 2010/0146971 A1 * | 6/2010 | Mak | 60/651 |
| 2010/0205979 A1 * | 8/2010 | Gentry et al. | 62/50.3 |
| 2010/0229573 A1 * | 9/2010 | Ehrstrom | 62/50.2 |
| 2011/0167824 A1 * | 7/2011 | Mak | 60/651 |
| 2011/0289941 A1 * | 12/2011 | Gonzalez Salazar et al. | 62/50.2 |
| 2012/0036888 A1 * | 2/2012 | Vandor | 62/613 |

FOREIGN PATENT DOCUMENTS

| | | |
|---|---|---|
| WO | 2007/104076 | 9/2007 |
| WO | 2007105042 | 9/2007 |

* cited by examiner

CONFIGURATIONS AND METHODS FOR WASTE HEAT RECOVERY AND AMBIENT AIR VAPORIZERS IN LNG REGASIFICATION

This application claims priority to our U.S. provisional application with the Ser. No. 61/081,636, which was filed Jul. 17, 2008.

FIELD OF THE INVENTION

The field of the invention is LNG (liquefied natural gas) regasification, and especially regasification using ambient air vaporization and low-grade/waste heat.

BACKGROUND OF THE INVENTION

LNG vaporization is a relatively energy intensive process, which typically requires a heat duty equivalent to about 1.5% of the energy content in the LNG. This significant energy demand is often met by use of seawater as an external heat source. However, regasification of LNG using seawater is environmentally problematic due to the local reduction of water that adversely affects sea life cycles and habitats. Alternatively, LNG can be vaporized using fuel gas combustion in submerged combustion vaporizers. However, such system requires fuel gas and tends to create undesirable emissions.

In still further known methods of regasifying liquefied gases, ambient air is used as a heat source in an ambient air vaporizer. While this type of vaporizer is fairly common in cryogenic plants (e.g., nitrogen vaporizers), ambient air vaporizers are generally limited to relatively small capacity and will in most cases fail to produce an ambient temperature gas product from LNG. When applied to LNG vaporization, ambient air vaporizers can typically produce a vaporized product at about −40° F., which is not acceptable to most pipeline specifications. To increase the temperature of vaporized LNG, heat is supplemented to an ambient air vaporizer as taught in U.S. Pat. No. 7,392,767. Here, a quench column is employed as a heat source for heating of a circulating liquid, and an additional indirect heat exchanger is employed to produce a hot liquid stream that supplies heat to vaporize the LNG. While such quench column configuration can be effective in some waste heat recovery configurations, particularly from waste heat from the gas turbine exhaust, over-chilling of the exhaust gas to a temperature below the dew point of the exhaust gas is unavoidable, resulting in undesirable waste by-products that must be neutralized or otherwise disposed of.

Alternatively, as described in U.S. Pat. No. 5,251,452, LNG ambient air vaporizers can be operated using cyclic heating and defrosting. While such vaporization is conceptually simple and does not require LNG as a fuel source, various disadvantages nevertheless remain. Among other things, such ambient air vaporization schemes generally require a relatively large number of air vaporizers, plot space, and consequently high operating and capital cost. To circumvent at least some of the above drawbacks, various new configurations have been described that help recover power at the LNG receiving terminal. In such configurations, LNG is used as a heat sink for power generation, and/or as fuel to a power plant as described in our copending International patent applications with the serial numbers PCT/US03/25372 (published as WO 2004/109206 A1), PCT/US03/26805 (published as WO 2004/109180 A1), and PCT/US05/24973 (published as WO 2006/019900 A1), all of which are incorporated by reference herein.

While most of these configurations tend to reduce energy consumption to at least some extent (e.g., via ambient air vaporizers and/or waste heat recovery from gas turbine exhaust), such configuration are still relatively inefficient often generate liquid effluent without significant improvement in power generation efficiencies. In further known configurations, as described in U.S. Pat. No. 5,457,951, LNG is regasified in an integrated combined cycle power plant using a heat transfer medium where the working fluid of the steam cycle is in thermal exchange with a heat exchange fluid of the heat exchanger in which the LNG is vaporized and wherein the heat exchange fluid further chills the intake air of the compressor. However, such configurations are typically limited to conventional heat exchangers and therefore fail to take advantage of the benefits of ambient air exchangers.

Therefore, while numerous processes and configurations for power plants with LNG utilization and/or regasification are known in the art, all of almost all of them suffer from one or more disadvantages. Thus, there is still a need to provide improved configurations and methods for waste heat recovery in the area of ambient air vaporizers in LNG regasification.

SUMMARY OF THE INVENTION

The present invention is directed to configurations and methods of LNG regasification in which heat from ambient air and a non-ambient air source is used to vaporize LNG. Most preferably, contemplated methods and configurations include an ambient air vaporizer and a heat exchanger in which a heat transfer medium heats the vaporized natural gas from the ambient air vaporizer, wherein the transfer medium is heated using a primary and continuous source that provides sufficient heat to raise the vaporized natural gas to pipeline transmission temperature.

In one aspect of the inventive subject matter, a power plant comprises an ambient air exchanger that vaporizes LNG to a cold vaporized natural gas stream having a first temperature. A first heat exchanger is coupled to the ambient air exchanger and receives and heats the cold vaporized natural gas stream to a second temperature using heat from a heat transfer medium in a heat transfer medium circuit. Most preferably, the heat transfer medium circuit is thermally coupled to a waste heat source that is a primary and continuous source of heat for the heat transfer medium circuit; and the waste heat source allows heating of the heat transfer medium in an amount sufficient to raise the temperature of the cold vaporized natural gas stream from the first temperature to the second temperature. In such configurations and methods, it is also preferred that condensed water from the ambient air exchanger is provided to the heat recovery steam generator.

It is especially preferred that the waste heat source comprises a heat recovery steam generator, and that the heat transfer medium circuit is coupled to the heat recovery steam generator via a second and a third heat exchanger. It is still further preferred that the waste heat source is the only source of heat to the heat transfer medium circuit. Where the heat recovery steam generator comprises a selective catalyst reduction unit it is generally preferred that the plant also includes a control unit that adjusts flow rates of the heat transfer medium in various lines of the heat transfer medium circuit to thereby maintain a desired temperature in the selective catalyst reduction unit. In yet further contemplated aspects, the heat transfer medium circuit is heated with waste heat from at least two different sources, and/or the plant may include a second ambient air exchanger that alternately operates with the first ambient air exchanger.

Consequently, the inventor also contemplates a method of regasification of LNG and producing power in which in one step LNG is vaporized in an ambient air exchanger to form a cold vaporized natural gas stream. In another step, the cold vaporized natural gas stream is heated in a first heat exchanger using a heat transfer medium of a heat transfer medium circuit, wherein the heat transfer medium circuit is thermally coupled to a heat source other than ambient air. Most typically, the waste heat source is a primary and continuous source of heat for the heat transfer medium circuit (e.g., a heat recovery steam generator), which is typically coupled to the heat transfer medium circuit via at least two heat exchangers. For example, such heat exchangers may use boiler feed water of the heat recovery steam generator as a heat source. With respect to a selective catalytic reduction unit (where implemented), the same considerations as provided above apply.

Thus, viewed from a different perspective, a method of gasifying LNG will include a step of vaporizing LNG in an ambient air vaporizer and another step of heating the vaporized LNG in a downstream heat exchanger to a temperature suitable for pipeline transmission by using heat from boiler feed water as a primary and continuous source of heat (e.g., BFW from heat recovery steam cycle). Where desired, the BFW can advantageously be used to defrost the ambient air vaporizer.

Various objects, features, aspects and advantages of the present invention will become more apparent from the following detailed description of preferred embodiments of the invention.

DETAILED DESCRIPTION

The present invention is directed to configurations and methods of vaporizing LNG in a plant in which LNG is vaporized using one or more ambient air exchangers to a relatively low temperature (e.g., about −40° F.) and in which the cold vaporized LNG is further heated by a heat transfer fluid via indirect heat exchange with a waste heat or low-grade heat source. For example, in most preferred configurations, recirculating BFW (boiler feed water) is used to extract the gas turbine heat, and to control the dew point temperature of the exhaust gas to so avoid condensation. Thus, a method of gasifying LNG is contemplated where LNG is vaporized in an ambient air vaporizer and further heated in a downstream heat exchanger to a temperature that is suitable for pipeline transmission, wherein heat from boiler feed water is used as a primary and continuous source of heat for the heat exchanger.

Most preferably, the waste heat is also used to generate a high pressure steam that is used for power generation via a condensing steam turbine where the steam condensation waste heat is recovered by the heat transfer fluid for LNG heating. Where desirable, at least a portion of the steam is employed to superheat a portion of the LNG for defrosting the ambient air vaporizers. Consequently, a power plant and methods of operating a power plant are contemplated where an ambient air exchanger is used to vaporize LNG to a cold vaporized natural gas stream at a first temperature. A heat exchanger then receives and heats the cold vaporized natural gas stream to a second temperature using heat from a heat transfer medium in a heat transfer medium circuit that is thermally coupled to a waste heat source that acts as a primary and continuous source of heat for the heat transfer medium circuit. While numerous waste heat sources are deemed suitable, it is especially preferred that the waste heat source allows heating of the heat transfer medium in an amount sufficient to raise the temperature of the cold vaporized natural gas stream from the first temperature to the second temperature.

Viewed from a different perspective, a method of regasification of LNG and producing power is contemplated in which LNG is vaporized in an ambient air exchanger to form a cold vaporized natural gas stream. The cold vaporized natural gas stream is then heated in a first heat exchanger using a heat transfer medium of a heat transfer medium circuit that is thermally coupled to a heat source other than ambient air. It is especially preferred that the waste heat source is a primary and continuous source of heat for the heat transfer medium circuit, and particularly preferred sources include heat recovery steam generators.

Figure 1:
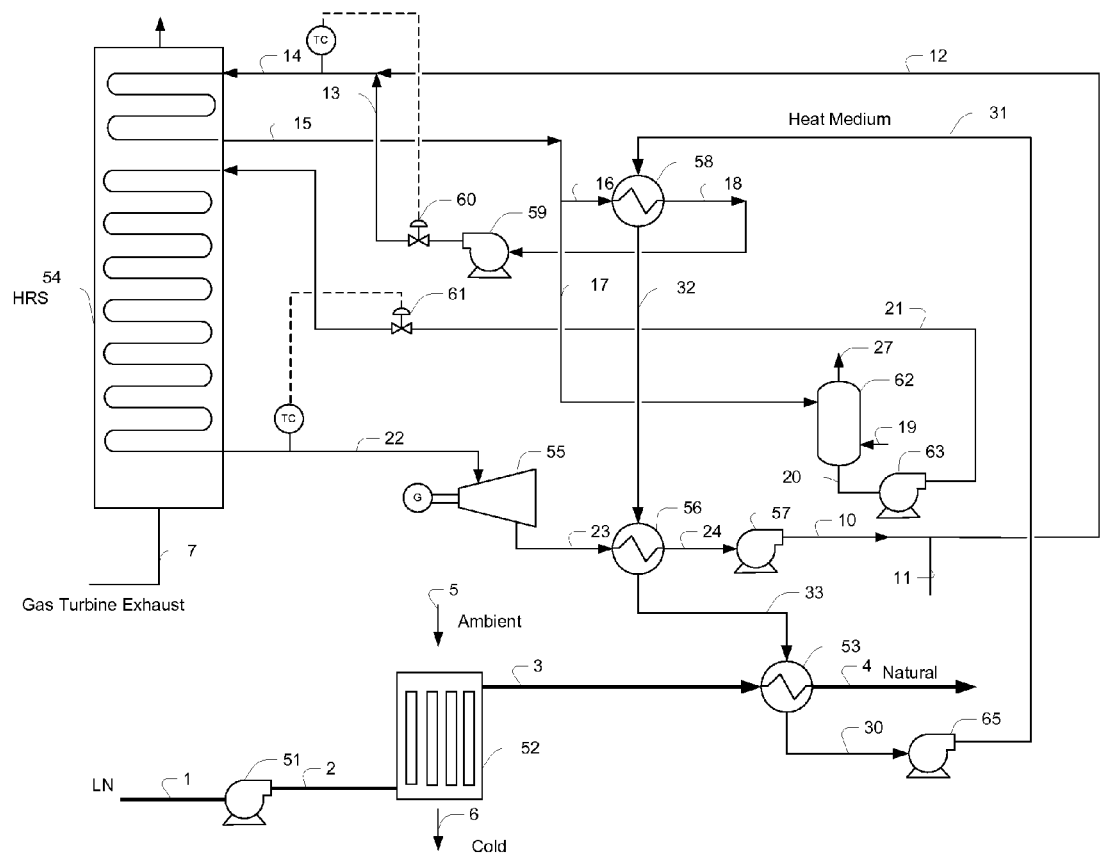
FIG. 1 is a schematic of one exemplary power plant with LNG regasification according to the inventive subject matter.

For example, as depicted in the exemplary plant of FIG. 1, LNG from storage (stream 1), typically at a sendout rate of 100 MMscfd to 1,000 MMscfd or higher, is pressurized by LNG pump 51 to about 1,000 psig to 1,600 psig forming stream 2. The term "about" where used herein in conjunction with a numeral refers to a +/− 10% range of that numeral. LNG is heated in ambient air vaporizers 52, from −255° F. to about −40° F. forming stream 3. The ambient air vaporizer typically comprises heat exchange tubes that transfer heat from the downward flow of air to the upward flow of LNG in the vaporizer tubes while ice is formed on tubes typically in the lower part of the vaporizer at the entry point of the LNG. Ambient air stream 5, typically at 60° F. to 100° F. with relatively humidity from 40% to 100%, is cooled to about −20° F. forming a moisture free air stream 6. When the ambient air vaporizers are completely frosted with ice, their heat transfer areas will become ineffective, and the ice layers must be removed by defrosting. The defrosting cycle time depends on the ambient humidity conditions and the defrosting method. Condensate water stream 6 removed from the ambient air vaporizers during the defrosting cycle is of condensate quality which can be used as boiler feed water makeup. The partially heated and vaporized LNG stream 3 is then further heated in exchanger 53 using a heat transfer fluid 33 to about 36° F., forming natural gas stream 4 to the pipeline.

Most preferably, the heat transfer fluid circuit is heated with waste heat from at least two different sources, from the BFW recirculating circuit and from the condensing steam turbine discharge. For example, and as shown in FIG. 1, the heat transfer fluid stream 30 from the trim heater 53 is pumped by pump 65 forming stream 31 which is heated by the hot BFW stream 16 in heat exchanger 58 to about 80° F. to 100° F. forming stream 32, which is further heated in exchanger 56 using the steam turbine discharge stream 23, forming the heated stream 33 at 80° F. to 120° F., that is recirculated supplying heat to the trim heater 53.

Gas turbine exhaust stream 7 at about 1000° F. is used to produce high pressure steam, stream 22, at 600 psig and 750° F. from the waste heat recovery steam generation, HRSG 54. The temperature of the high pressure steam is controlled by control valve 61, maintaining an optimum temperature that meets heating requirements by the heat transfer fluid for LNG heating and the steam requirement for power generation. The high pressure steam is used to generate power in the steam turbine 55, by exhausting to about 2 psia pressure forming stream 23. The exhaust steam is condensed in a vacuum condenser 56 at about 120° F. forming stream 24, using the heat transfer fluid stream 32 as the cooling medium. It should be appreciated that cooling water is not required in this power generation configuration, while the power production can be even higher when operating at a lower vacuum utilizing LNG cold.

It is further especially preferred that the BFW flow is controlled by a control unit to maintain the temperature of the gas turbine exhaust gas at least 10° F. above the dew point, typically by splitting the BFW flow into two portions, with one portion supplying heat to the heat transfer fluid circuit and the other portion to the de-aerator for steam production. Most preferably, the heat transfer fluid is further heated by the steam turbine discharge to heat the vaporized LNG from the ambient air vaporizer as further described below.

More particularly, the BFW stream 24 is pumped by pump 57 to about 50 psig forming stream 10. Water makeup, stream 11 (preferably produced using defrosted water from the ambient air vaporizers), is added forming stream 12 that is mixed with the recirculating BFW stream 13 forming stream 14 that is fed to the HRSG 54. The heated BFW stream 15 from the HRSG is split into two portions: Stream 16 and 17. The split ratio (stream 16:15), typically in the ratio of 0.1 to 0.7, depends on the heat requirements in exchanger 58. The ratio tends to increase with increasing duty required in exchanger 58 as needed to maximizing heat recovery. Stream 16 is cooled in heat exchanger 58, forming stream 18, providing heat to the heat transfer fluid. The BFW is then pump by pump 59 forming 13. The flow rate of stream 13 is controlled by a temperature controller using control valve 60, controlling the temperature of BFW to the HRSG, typically at about 110° F., at least 10° F. above the dew point temperature of the exhaust gas. It should be appreciated that the BFW recirculating system and control method provide a significant contribution to maximizing heat recovery while avoiding operation problems from gas condensation consequently reducing or even eliminating corrosion and liquid waste stream.

The heated BFW stream 17 is routed to de-aerator 62 where low pressure steam stream 19 is used to remove the oxygen content from the BFW stream, avoiding corrosion in the steam generating system. The de-aerated water stream 20 is pumped by the BFW pump 63 to about 700 psig forming stream 21 and routed to the HRSG for steam generation. Air/oxygen leaves de-aerator 62 as stream 27.

Figure 2:
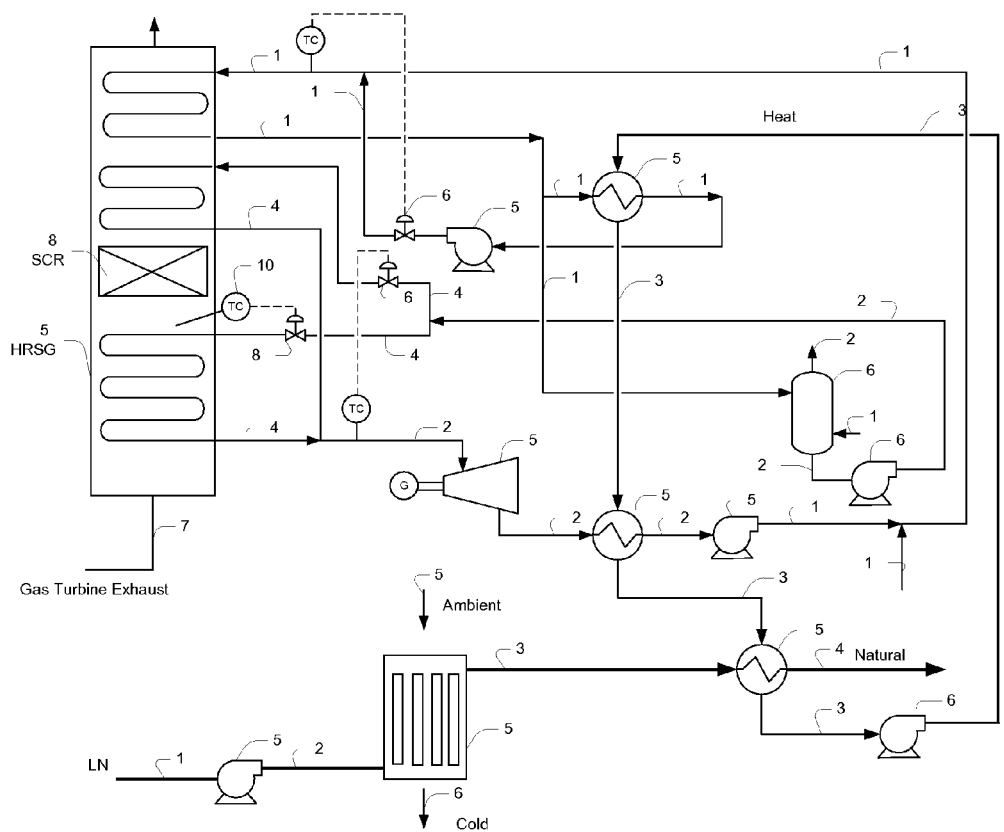
FIG. 2 is a schematic of another exemplary power plant with LNG regasification and selective catalytic reduction unit according to the inventive subject matter.

An alternative configuration is shown in FIG. 2 which includes an SCR (selective catalyst reduction) unit 82 for removing NOx, SOx and other emissions from the exhaust gas prior to discharge to the atmosphere. FIG. 2 is similar to the configuration in FIG. 1 with the exception that an SCR unit is embedded in the HRSG stack 54. Therefore, the BFW flow stream 21 is split into two portions: stream 41 and stream 42. The flow rate of stream 42 is controlled via valve 81 such that the gas turbine exhaust is cooled to an optimum temperature (measured at sensor 101), typically at 750° F., required by the design of the SCR catalysts. The flow rate of stream 43 is controlled by control valve 61 for meeting the LNG heating requirement exchanger 56 and in maximizing power generation by steam turbine 55. Preferably, streams 43 and 44 are combined prior to feeding to steam turbine 55. With respect to the remaining components in FIG. 2, the same considerations apply for like numerals for components of FIG. 1.

Figure 3:
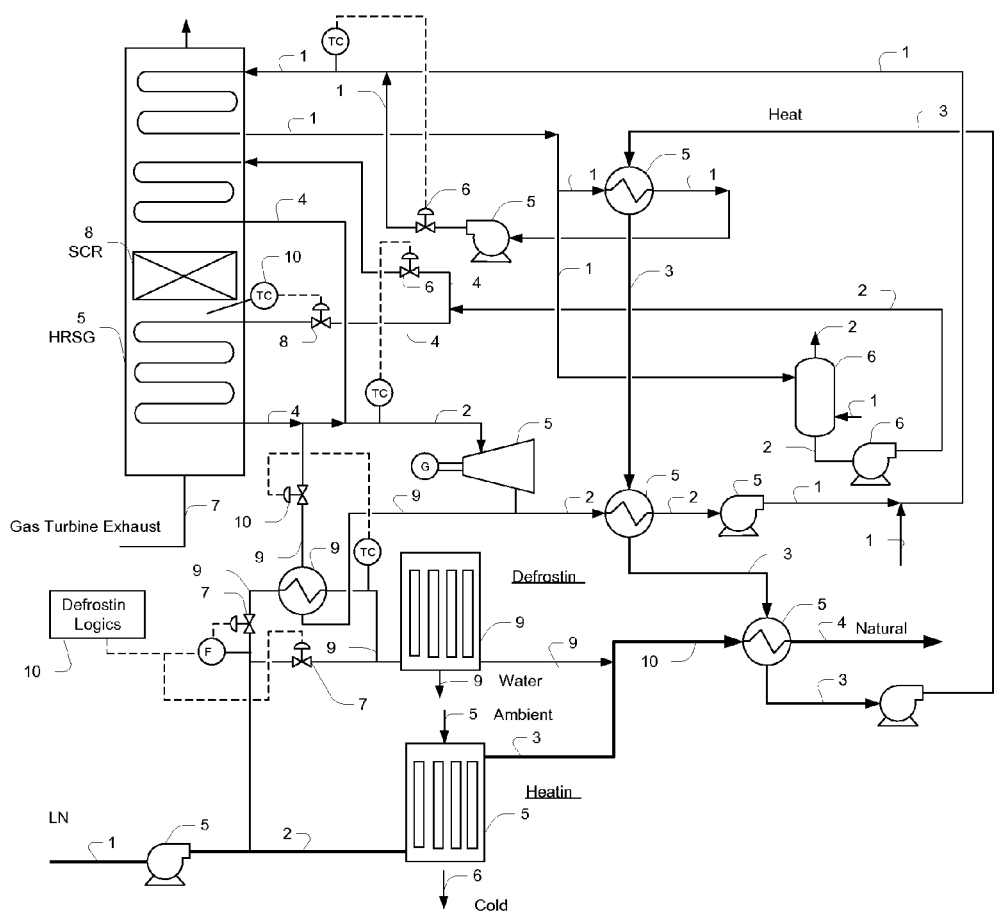
FIG. 3 is a schematic of another exemplary power plant according to FIG. 2 with an ambient air vaporizer defrosting system.

A further alternative configuration is shown in FIG. 3 in which steam is employed for defrosting the ambient air vaporizers. In such configurations and methods, it is generally preferred that at least a second ambient air vaporizer is employed and alternately operated with respect to the first vaporizer such that the second vaporizer is in defrost mode when the first vaporizer is in vaporization mode. A typical configuration is similar to FIG. 2 with the exception that a portion of the high pressure steam is used for vaporizing and superheating of a portion of the LNG for defrosting. During the defrosting cycle of ambient air vaporizer 99, under a defrosting logics controller 102, LNG inlet valve 72 is closed and LNG flow control valve 71 is opened that controls the flow rate at about 4 to 40 MMscfd. Stream 91 is superheated in exchanger 98 using steam stream 92 (via valve 103) to about 200° F. forming stream 93 that is routed to the defrosting ambient air vaporizer 99. The cooled defrosted gas stream 95 is mixed with the heated gas from the ambient air vaporizers under the heating cycle, forming a combined stream 103 to the trim heater 53. Cooled steam 94 from exchanger 98 is combined with the steam turbine effluent to form stream 23 that is then fed to exchanger 56. Still further, it should be noted that contemplated configurations and methods presented herein advantageously allow recovery of high-quality condensate as makeup water to the steam system, without the use of steam or fuel or chemical treatment. As such, the use of recovered condensate reduces water usage by the steam power plant and eliminates waste discharges from boiler feed water treatment plant. With respect to the remaining components in FIG. 3, the same considerations apply for like numerals for components of FIGS. 1 and 2. Thus, preferred configurations and methods take advantage of steam produced from the gas turbine exhaust to heat a portion of LNG to thereby accelerate defrosting of an ambient air vaporizer using control logics (especially where two or more ambient air vaporizers operate in alternating sequence).

Therefore, it should be especially recognized that contemplated configurations and methods can readily accommodate variable volumes of LNG sendout, different ambient air vaporizers, and/or different waste heat sources (e.g., gas turbines, industrial waste heat, solar heat, geothermal heat). Moreover, contemplated configurations and methods will be operable at varying environmental and process conditions as the waste heat source is the primary and continuous source of heat. Among other benefits, such configuration and method will allow continuous operation that is independent from ambient temperature and/or LNG process volume. As used herein, the term "primary and continuous source of heat" means that the heat source or heat sources provide at least 51%, more typically at least 70%, even more typically at least 90% of the heat required to heat the heat transfer medium to a temperature suitable for heating the vaporized LNG to pipeline (or transmission, processing, or storage) temperature, and that the heat source or heat sources continuously provide the heat during all times when the LNG is vaporized in the ambient air vaporizer(s).

It should further be noted that in especially preferred aspects the waste heat source or waste heat sources is/are the only source of heat to the heat transfer medium circuit. Where multiple waste heat sources are provided, it should be appreciated that the heat transfer medium circuit may be configured to allow heating with waste heat from at least two different sources (e.g., boiler feed water and steam turbine exhaust). While not limiting to the inventive subject matter, it is preferred that the heat transfer fluid for the LNG regasification exchanger comprises a solution that is non-freezing at the cryogenic temperature of LNG, and that has favorable heat transfer characteristics. For example, suitable fluids may comprise a glycol water solution (e.g., ethylene glycol or propylene glycol), a solvent, or a salt based solution (e.g., potassium formate solution). However, many alternative solvents and concentration with favorable thermal physical properties are also deemed suitable for use herein.

Finally, it should be appreciated that the thermally integrated configurations presented herein result in a significant increase in power output and power generation efficiency while reducing the capital cost of the LNG regasification plant, especially where the vaporizers are defrosted as provided above.

Thus, specific embodiments and applications of waste heat recovery and ambient air vaporizer configurations have been disclosed. It should be apparent, however, to those skilled in the art that many modifications besides those already described are possible without departing from the inventive concepts herein. The inventive subject matter, therefore, is not to be restricted except in the spirit of the present disclosure. Moreover, in interpreting the specification and contemplated claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Furthermore, where a definition or use of a term in a reference, which is incorporated by reference herein is inconsistent or contrary to the definition of that term provided herein, the definition of that term provided herein applies.

What is claimed is:

1. A power plant comprising:
    an ambient air exchanger configured to vaporize LNG to a cold vaporized natural gas stream having a first temperature;
    a first heat exchanger coupled to the ambient air exchanger and configured to receive and heat the cold vaporized natural gas stream to a second temperature using heat from a heat transfer medium in a heat transfer medium circuit;
    wherein the heat transfer medium circuit is thermally coupled to a heat recovery steam generator via a power steam circuit, the power steam circuit comprising a steam turbine exhausting steam into a second heat exchanger for condensing the exhaust steam into feedwater the second heat exchanger being configured to provide heat to the heat transfer medium circuit;
    a first feedwater pump configured for pumping the feedwater to the heat recovery steam generator for heating into hot feedwater;
    a third heat exchanger configured to receive at least a portion of the hot feedwater and to provide heat to the heat transfer medium circuit, and wherein the heat recovery steam generator is a primary and continuous source of heat for the heat transfer medium circuit; and
    wherein the heat recovery steam generator is configured to allow heating of the heat transfer medium in an amount sufficient to raise the temperature of the cold vaporized natural gas stream from the first temperature to the second temperature.

2. The power plant of claim 1 wherein the heat recovery steam generator is the only source of heat to the heat transfer medium circuit.

3. The power plant of claim 1 wherein the heat recovery steam generator comprises a selective catalyst reduction unit.

4. The power plant of claim 3 further comprising a control unit that is configured to adjust flow rates of the heat transfer medium in various lines of the heat transfer medium circuit to thereby maintain a desired temperature in the selective catalyst reduction unit.

5. The power plant of claim 1 further comprising a second ambient air exchanger, wherein the plant is configured to allow alternate operation of the ambient air exchanger and second ambient air exchanger.

6. The power plant of claim 1 further comprising a conduit that is configured to provide condensed water from the ambient air exchanger to the heat recovery steam generator.

7. A method of regasification of LNG and producing power, comprising:
    vaporizing LNG in an ambient air exchanger to form a cold vaporized natural gas stream;
    heating the cold vaporized natural gas stream in a first heat exchanger using a heat transfer medium of a heat transfer medium circuit,
    wherein the heat transfer medium circuit is thermally coupled to a heat recovery steam generator via a power steam circuit, the power steam circuit comprising a steam turbine exhausting steam into a second heat exchanger for condensing the exhaust steam into feedwater, the feedwater being pumped by a first feedwater pump to the heat recovery steam generator for heating into hot feedwater, the hot feedwater subsequently providing heat to the heat transfer medium circuit via a third heat exchanger; and
    wherein the heat recovery steam generator operates as primary and continuous source of heat for the heat transfer medium circuit.

8. The method of claim 7 wherein the heat recovery steam generator is the only source of heat to the heat transfer medium circuit.

9. The method of claim 8 wherein the heat recovery steam generator comprises a selective catalyst reduction unit.

10. The method of claim 9 further comprising a step of using a control unit to adjust flow rates of the heat transfer medium in various lines of the heat transfer medium circuit to thereby maintain a desired temperature in the selective catalyst reduction unit.

11. The method of claim 8 further comprising a step of using condensed water from the ambient air exchanger as working fluid in the heat recovery steam generator.

12. The method of claim 7 further comprising a second ambient air exchanger, and alternately operating the ambient air exchanger and second ambient air exchanger.

* * * * *